United States Patent
Fu et al.

(10) Patent No.: US 11,244,491 B2
(45) Date of Patent: Feb. 8, 2022

(54) METHOD FOR EXITING SPLIT-SCREEN, ELECTRONIC DEVICE, AND NON-TRANSITORY COMPUTER READABLE STORAGE MEDIUM

(71) Applicant: GUANGDONG OPPO MOBILE TELECOMMUNICATIONS CORP., LTD., Guangdong (CN)

(72) Inventors: Liangjing Fu, Guangdong (CN); Tongxi Li, Guangdong (CN); Dan Cao, Guangdong (CN); Zhiyong Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/997,795

(22) Filed: Aug. 19, 2020

(65) Prior Publication Data

US 2020/0380752 A1 Dec. 3, 2020

Related U.S. Application Data

(63) Continuation of application No. PCT/CN2019/082141, filed on Apr. 10, 2019.

(30) Foreign Application Priority Data

Apr. 19, 2018 (CN) .......................... 201810353058.2

(51) Int. Cl.
*G06T 13/80* (2011.01)
*G06T 11/60* (2006.01)
(Continued)

(52) U.S. Cl.
CPC .......... *G06T 13/80* (2013.01); *G06F 3/04842* (2013.01); *G06F 3/04886* (2013.01);
(Continued)

(58) Field of Classification Search
CPC .. G06F 3/04886; G06F 3/04842; G06F 9/452; G06F 9/5027; G06F 3/14;
(Continued)

(56) References Cited

U.S. PATENT DOCUMENTS

| | | | | |
|---|---|---|---|---|
| 5,260,695 A | * | 11/1993 | Gengler | ................... H04N 9/76 |
| | | | | 345/592 |
| 2013/0044050 A1 | * | 2/2013 | Ylivainio | .............. G06F 40/169 |
| | | | | 345/156 |

(Continued)

FOREIGN PATENT DOCUMENTS

| | | |
|---|---|---|
| CN | 101923425 | 12/2010 |
| CN | 103324435 | 9/2013 |

(Continued)

OTHER PUBLICATIONS

WIPO, ISR for PCT/CN2019/082141, Jun. 27, 2019.

(Continued)

*Primary Examiner* — Todd Buttram
(74) *Attorney, Agent, or Firm* — Hodgson Russ LLP

(57) ABSTRACT

Provided are a method for exiting a split-screen, a storage medium, and an electronic device. The method includes the following. An instruction for exiting a split-screen is received. Current window information of a current window is obtained. First window information and first animation information are obtained according to the current window information. The first animation information is adjusted. The first window is drawn according to the first window information, first animation is obtained according to the first animation information adjusted, and switch, with the first animation, from the current window to the first window.

16 Claims, 7 Drawing Sheets

(51) Int. Cl.
  *G06F 9/451*     (2018.01)
  *G06F 9/50*      (2006.01)
  *G06F 3/0488*    (2013.01)
  *G09G 5/14*      (2006.01)
  *G06F 3/0484*    (2013.01)

(52) U.S. Cl.
  CPC ............ *G06F 9/452* (2018.02); *G06F 9/5027* (2013.01); *G06T 11/60* (2013.01); *G09G 5/14* (2013.01); *G06T 2200/24* (2013.01)

(58) Field of Classification Search
  CPC .... G09G 5/14; G09G 2340/125; G09G 5/395; G09G 2340/10; G06T 13/80; G06T 11/60
  See application file for complete search history.

(56) References Cited

U.S. PATENT DOCUMENTS

| | | |
|---|---|---|
| 2014/0208328 A1 | 7/2014 | Chen |
| 2014/0325431 A1 | 10/2014 | Vranjes et al. |
| 2015/0309779 A1* | 10/2015 | Baskaran ............... G06F 8/4432 717/154 |
| 2015/0347179 A1 | 12/2015 | Barraclough et al. |
| 2016/0283366 A1 | 9/2016 | Tien et al. |
| 2016/0335737 A1 | 11/2016 | Shah et al. |
| 2017/0168628 A1 | 6/2017 | Yin |
| 2017/0344253 A1* | 11/2017 | Zhang ............... H04M 1/72484 |
| 2018/0121082 A1 | 5/2018 | Zhu et al. |

FOREIGN PATENT DOCUMENTS

| | | |
|---|---|---|
| CN | 103955264 | 7/2014 |
| CN | 102591656 | 2/2015 |
| CN | 104820557 | 8/2015 |
| CN | 105739998 | 7/2016 |
| CN | 106020592 | 10/2016 |
| CN | 106155559 | 11/2016 |
| CN | 106528084 | 3/2017 |
| CN | 106537319 | 3/2017 |
| CN | 106814936 | 6/2017 |
| CN | 106874097 | 6/2017 |
| CN | 107037949 | 8/2017 |
| CN | 107823881 | 3/2018 |

OTHER PUBLICATIONS

SIPO, First Office Action for CN Application No. 201810353058.2, dated Aug. 21, 2019.
IPI, Office Action for IN Application No. 202017035708, dated Jul. 13, 2021.
EPO, Extended European Search Report for EP Application No. 19788857.1, dated Apr. 30, 2021.

* cited by examiner

METHOD FOR EXITING SPLIT-SCREEN, ELECTRONIC DEVICE, AND NON-TRANSITORY COMPUTER READABLE STORAGE MEDIUM

CROSS-REFERENCE TO RELATED APPLICATION(S)

This application is a continuation of International application No. PCT/CN2019/082141, filed Apr. 10, 2019, which claims priority to Chinese Patent Application No. 201810353058.2, filed Apr. 19, 2018, the entire disclosures of which are incorporated herein by reference.

TECHNICAL FIELD

This disclosure relates to the technical field of electronic displays, and particularly to a method for exiting a split-screen display mode, an electronic device, and a non-transitory computer readable storage medium.

BACKGROUND

With the development of terminal technology and touch technology, screens of terminals are increasing in size. To make full use of a large screen, the terminal is designed to support a split-screen display mode. In the split-screen display mode, the terminal divides a display interface on a screen of the terminal into two display sub-interfaces, where contents of different applications may be displayed on the two display sub-interfaces, respectively. However, for the terminal, lag usually occurs during exit of split-screen.

SUMMARY

According to a first aspect, a method for exiting a split-screen is provided. The method is applicable to an electronic device and includes the following. An instruction for exiting a split-screen is received, and current window information of a current window is obtained, where contents of at least two applications are displayed in the current window. First window information and first animation information are obtained according to the current window information, where the first window information is used for drawing a first window. The first animation information is adjusted to reduce system resources occupied by a first animation corresponding to the first animation information adjusted. The first window is drawn according to the first window information, the first animation is obtained according to the first animation information adjusted, and switch, with the first animation, from the current window to the first window, where content of one of the at least two applications is displayed in the first window.

According to a second aspect, an electronic device is provided. The electronic device includes a processor and a memory storing computer programs. The computer programs are executable on the processor and the processor is configured to receive an instruction for exiting a split-screen; obtain current window information of a current window, wherein contents of at least two applications are displayed in the current window; obtain, according to the current window information, first window information and first animation information, wherein the first window information is used for drawing a first window; adjust the first animation information to reduce system resources occupied by a first animation corresponding to the first animation information adjusted; draw the first window according to the first window information, obtain the first animation according to the first animation information adjusted, and switch, with the first animation, from the current window to the first window, wherein content of one of the at least two applications is displayed in the first window.

According to a third aspect, a non-transitory computer readable storage medium is provided. The non-transitory computer readable storage medium is configured to store computer programs which, when executed by a processor, are operable with the processor to: receive an instruction for exiting a split-screen; obtain current window information of a current window, wherein contents of at least two applications are displayed in the current window; obtain, according to the current window information, first window information and first animation information, wherein the first window information is used for drawing a first window; adjust the first animation information to reduce system resources occupied by a first animation corresponding to the first animation information adjusted; draw the first window according to the first window information, obtain the first animation according to the first animation information adjusted, and switch, with the first animation, from the current window to the first window, wherein content of one of the at least two applications is displayed in the first window.

BRIEF DESCRIPTION OF THE DRAWINGS

In order to describe technical solutions of implementations or the related art more clearly, the following will give a brief description of accompanying drawings used for describing the implementations or the related art. Apparently, the accompanying drawings described below merely illustrate some implementations. Those of ordinary skill in the art can also obtain other accompanying drawings based on the accompanying drawings described below without creative efforts.

DETAILED DESCRIPTION

Figure 1:
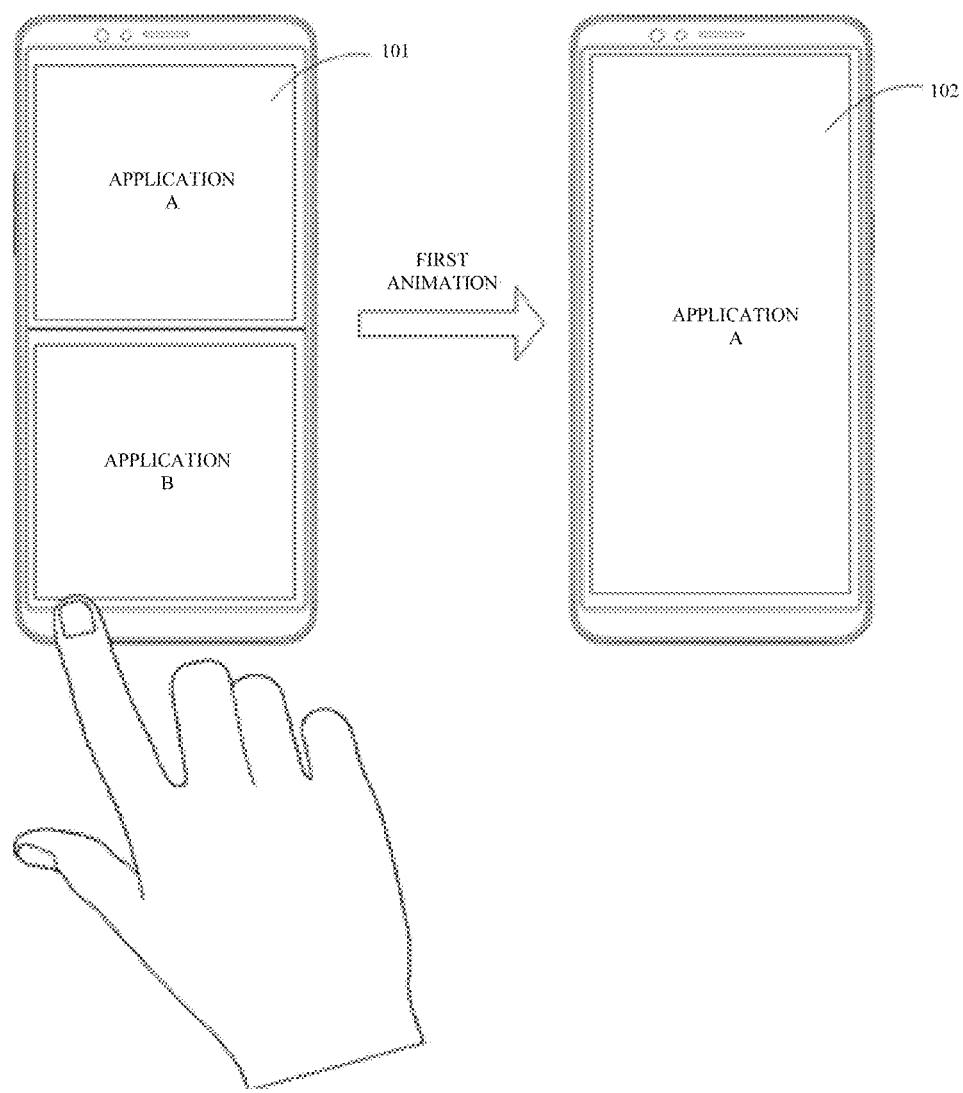
FIG. 1 is a schematic diagram illustrating a scenario to which a method for exiting a split-screen is applied according to implementations.

In the accompanying drawings, identical element symbols represent same elements. The implementations are illustrated in an appropriate computing environment. The implementations described herein are some implementations, which are not used for limiting other implementations not detailed herein.

Implementations provide a method for exiting a split-screen. The method includes the following. An instruction for exiting a split-screen is received, and current window information of a current window is obtained, where contents of at least two applications are displayed in the current window. First window information and first animation information are obtained according to the current window information, where the first window information is used for drawing a first window. The first animation information is adjusted to reduce system resources occupied by a first animation corresponding to the first animation information adjusted. The first window is drawn according to the first window information, the first animation is obtained according to the first animation information adjusted, and switch, with the first animation, from the current window to the first window, where content of one of the at least two applications is displayed in the first window.

In at least one implementation, the current window information of the current window is obtained as follows. An operating frequency of a processor of an electronic device is increased from a first operating frequency to a second operating frequency. The current window information of the current window is obtained with the processor having the second operating frequency. After drawing the first window according to the first window information, obtaining the first animation according to the first animation information adjusted, and switching, with the first animation, from the current window to the first window, the following can be conducted. The operating frequency of the processor is decreased from the second operating frequency to the first operating frequency.

In at least one implementation, after the instruction for exiting the split-screen is received, the following can be conducted. Multiple background applications are obtained. A preset background application irrelative to the instruction for exiting the split-screen is determined from the multiple background applications. Running of the preset background application is paused.

In at least one implementation, after switching, with the first animation, from the current window to the first window, the following can be conducted. Continue the running of the preset background application.

In at least one implementation, after the instruction for exiting the split-screen is received, the following can be conducted. Multiple background applications are obtained. A priority of each of the multiple background applications is obtained. A target background application having a priority lower than a predetermined priority threshold is determined from the multiple background applications. Running of the target background application is paused.

In at least one implementation, after switching, with the first animation, from the current window to the first window, the following can be conducted. Continue the running of the target background application.

In at least one implementation, after the instruction for exiting the split-screen is received, the following can be conducted. A priority of a first application related to the instruction for exiting the split-screen is obtained. Determine whether the priority of the first application is lower than a first level priority threshold. The priority of the first application is adjusted to be a first level priority in response to determining that the priority of the first application is lower than the first level priority threshold. Multiple applications currently running in the electronic device are obtained, the multiple applications are sorted in a descending order of priorities of the multiple applications, and the multiple applications sorted are controlled to work sequentially.

In at least one implementation, the first window information and the first animation information are obtained according to the current window information as follows. Second window information and second animation information are obtained according to the current window information, where the second window information is used for drawing a second window. The second animation information is adjusted to reduce system resources occupied by a second animation corresponding to the second animation information adjusted. The second window is drawn according to the second window information, and switch, with the second animation corresponding to the second animation information adjusted, from the current window to the second window, where contents of at least two applications are displayed in the second window, content of a predetermined application is displayed in both the current window and the second window, and an area of an interface of the predetermined application displayed in the second window is larger than that of the interface of the predetermined application displayed in the current window. The first window information and the first animation information are obtained according to the second window information.

In at least one implementation, the first animation information is adjusted to reduce the system resources occupied by the first animation corresponding to the first animation information adjusted as follows. Duration of display of the first animation is reduced or animation effects of the first animation is simplified to reduce the system resources occupied by the first animation corresponding to the first animation information adjusted.

In at least one implementation, switch, with the first animation, from the current window to the first window as follows. The current window is overlaid with a black image. The black image is overlaid with the first animation to switch to the first window.

Implementations further include a storage medium storing computer programs. The computer programs, when executable on a computer, cause the computer to perform the method for exiting the split-screen.

Implementations further include an electronic device. The electronic device includes a memory storing computer programs and a processor coupled with the memory. The computer programs are executable on the processor and the processor is configured to: receive an instruction for exiting a split-screen; obtain current window information of a current window, where contents of at least two applications are displayed in the current window; obtain, according to the current window information, first window information and first animation information, where the first window information is used for drawing a first window; adjust the first animation information to reduce system resources occupied by a first animation corresponding to the first animation information adjusted; draw the first window according to the first window information, obtain the first animation according to the first animation information adjusted, and switch, with the first animation, from the current window to the first window, where content of one of the at least two applications is displayed in the first window.

In at least one implementation, the processor configured to obtain the current window information of the current window is configured to: increase an operating frequency of a processor of the electronic device from a first operating frequency to a second operating frequency; obtain, with the processor having the second operating frequency, the current window information of the current window.

The processor is further configured to: decrease the operating frequency of the processor from the second operating frequency to the first operating frequency, after drawing the first window according to the first window information, obtaining the first animation according to the first animation information adjusted, and switching, with the first animation, from the current window to the first window.

In at least one implementation, the processor is further configured to: obtain multiple background applications; determine, from the multiple background applications, a preset background application irrelative to the instruction for exiting the split-screen; pause running of the preset background application.

In at least one implementation, the processor is further configured to: continue the running of the preset background application, after switching, with the first animation, from the current window to the first window.

In at least one implementation, the processor is further configured to: obtain the current window information of the current window and multiple background applications, in response to receiving the instruction for exiting the split-screen; obtain a priority of each of the multiple background applications; determine, from the multiple background applications, a target background application having a priority lower than a predetermined priority threshold; pause running of the target background application.

In at least one implementation, the processor is further configured to: continue the running of the target background application, after switching, with the first animation, from the current window to the first window.

In at least one implementation, the processor is further configured to: obtain a priority of a first application related to the instruction for exiting the split-screen, in response to receiving the instruction for exiting the split-screen; determine whether the priority of the first application is lower than a first level priority threshold; adjust the priority of the first application to be a first level priority in response to determining that the priority of the first application is lower than the first level priority threshold; obtain multiple applications currently running in the electronic device, sort the multiple applications in a descending order of priorities of the multiple applications, and control the multiple applications sorted to work sequentially.

In at least one implementation, the processor configured to obtain, according to the current window information, the first window information and the first animation information is configured to: obtain, according to the current window information, second window information and second animation information, where the second window information is used for drawing a second window; adjust the second animation information to reduce system resources occupied by a second animation corresponding to the second animation information adjusted; draw the second window according to the second window information, and switch, with the second animation corresponding to the second animation information adjusted, from the current window to the second window, where contents of at least two applications are displayed in the second window, content of a predetermined application is displayed in both the current window and the second window, and an area of an interface of the predetermined application displayed in the second window is larger than that of the interface of the predetermined application displayed in the current window; obtain, according to the second window information, the first window information and the first animation information.

In at least one implementation, the processor configured to adjust the first animation information to reduce the system resources occupied by the first animation corresponding to the first animation information adjusted is configured to: reduce duration of display of the first animation or simplify animation effects of the first animation to reduce the system resources occupied by the first animation corresponding to the first animation information adjusted.

In at least one implementation, the processor configured to switch, with the first animation, from the current window to the first window is configured to: overlay the current window with a black image; overlay the black image with the first animation to switch to the first window.

Implementations provide a method for exiting the split-screen. The method may be implemented by a device for exiting the split-screen or an electronic device integrated with the device for exiting the split-screen. The device for exiting the split-screen can be implemented with hardware or software. The electronic device may be a smartphone, a tablet computer, a personal digital assistant (PDA), a laptop computer, or a desktop computer.

FIG. 1 is a schematic diagram illustrating a scenario to which a method for exiting the split-screen is applied according to implementations. As illustrated in FIG. 1, content of two applications, for example, application A and application B, is displayed in a current window 101 of an electronic device, where each application's interface can be operated by a user. In one example, when the electronic device receives an instruction for exiting a split-screen, the electronic device switches, with a first animation, from the current window 101 to a first window 102, where the instruction for exiting the split-screen may be input in response to a long-press operation performed on a multi-task key. The first window 102 refers to a window after the split-screen is exited, and content of application A is displayed in the first window 102. The first animation refers to an animation subjected to optimization, and system resources occupied by the first animation can be reduced. In this way, it is possible to avoid lag during switching from the current window to the first window. In addition, application B is switched to the background or closed.

Figure 2:
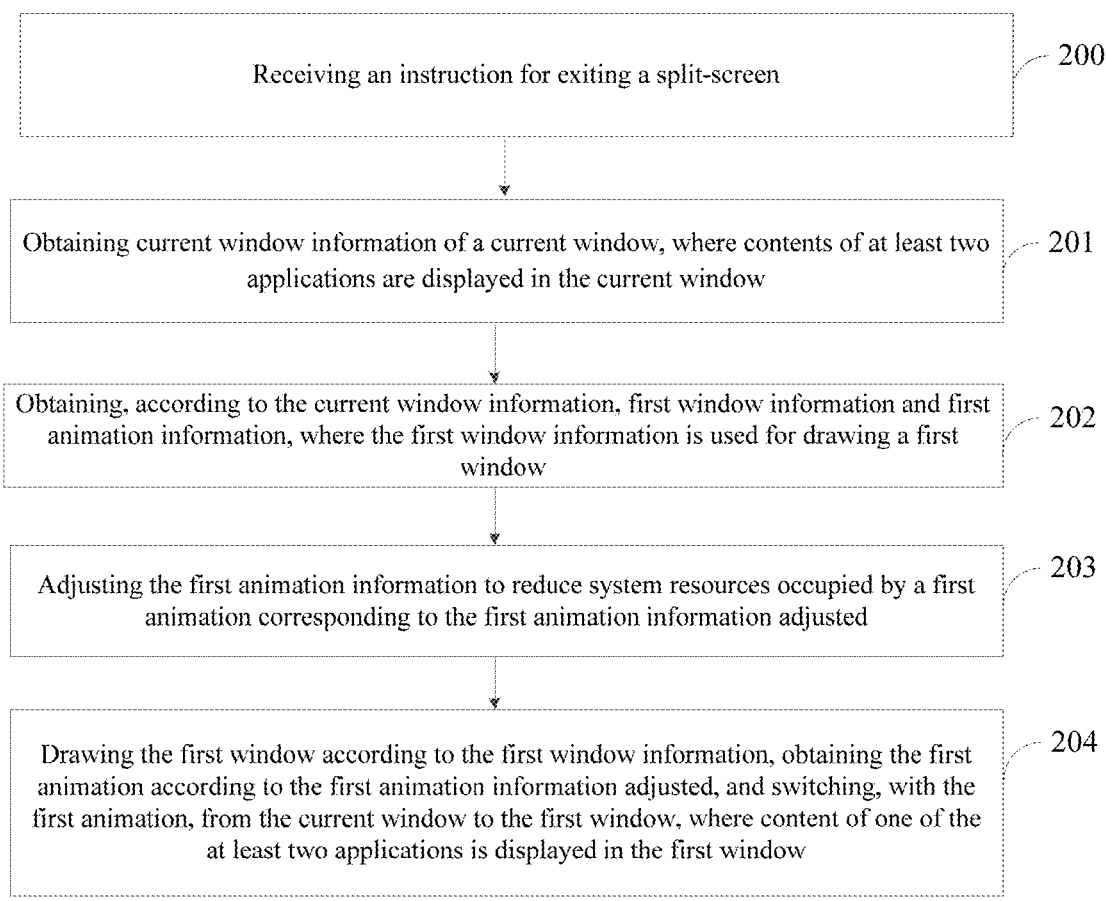
FIG. 2 is a schematic flow chart illustrating a method for exiting the split-screen according to implementations.

FIG. 2 is a schematic flow chart illustrating a method for exiting a split-screen according to implementations. As illustrated in FIG. 2, the method begins at block 201.

At block 200, an instruction for exiting a split-screen is received.

The instruction for exiting the split-screen may be input in response to a long-press operation on a certain function key, for example, the multi-task key, a menu key, or the like. Alternatively, the instruction for exiting the split-screen may be input in response to an operation of enabling that a ratio of an area of an interface of one of the at least two applications displayed in the current window to an area of the current window exceeds a predetermined ratio, such as 90%. Alternatively, the instruction for exiting the split-screen may be input in response to a gesture, for example, a gesture of sliding downwardly with three fingers.

At block 201, current window information of a current window is obtained, where contents of at least two applications are displayed in the current window.

The current window is a split-screen display window in which contents of two or more applications are simultaneously displayed. In the implementations, two applications are taken as an example for illustration. The current window is divided into two sub-windows, and in each sub-window, content of one of the two applications is displayed. The two applications run separately. Each application can receive a control instruction separately and corresponding content is accordingly displayed in response to the control instruction. For example, content of a video application may be displayed in one of the two sub-windows, and content of a chat application may be displayed in the other of the two sub-windows. Since the two applications can run separately, it is possible to allow the user to chat with others while watching videos.

The current window information contains information for drawing the current window, such as a size of the current window, a size of each of the two sub-windows, color of content displayed in each of the two sub-windows, and the content displayed in each of the two sub-windows. All the contents displayed in the current window can be drawn according to the current window information.

At block 202, first window information and first animation information are obtained according to the current window information, where the first window information is used for drawing a first window.

After the current window information is obtained, the first window information can be obtained according to the current window information. Thereafter, the first window can be drawn according to the first window information. The first window refers to a display window after the split-screen is exited, and content of one of the two applications is displayed in the first window. In addition, the first animation is obtained according to the first animation information. During switching from the current window to the first window, the first animation is used as a transition. For example, during switching from the current window to the first window, the current window disappears in gradient and the first window appears in gradient.

At block 203, the first animation information is adjusted to reduce system resources occupied by the first animation corresponding to the first animation information adjusted.

In at least one implementation, the first animation information is adjusted as follows. Duration of display of the first animation can be reduced. Alternatively, animation effects of the first animation can be simplified. Moreover, the first animation can be directly closed. Since the first animation information is adjusted, the system resources occupied by the first animation corresponding to the first animation information adjusted can be reduced.

In one example, the first animation can be closed as follows. The current window is overlaid with the first window. Alternatively, a black image is displayed in the whole current window before overlaying the current window with the first window. Alternatively, a screenshot of the content displayed in the current window can be taken and displayed in the current window, and the first window is drawn in the background. After drawing of the first window is completed, the current window is replaced with the first window.

At block 204, the first window is drawn according to the first window information, the first animation is obtained according to the first animation information adjusted, and switch, with the first animation, from the current window to the first window, where content of one of the at least two applications is displayed in the first window.

The first window is drawn according to the first window information. The first window refers to a display window after the split-screen is exited, and the content of one of the two applications is displayed in the first window. The first animation is obtained according to the first animation information adjusted. The first animation refers to an animation after adjustment. The system resources occupied by the first animation are less than that occupied by the first animation before adjustment. As such, during switching, with the first animation, from the current window to the first window, the system resources occupied by the first animation are reduced, thereby avoiding lag. The animation effects of the first animation may include rotation, enlarging, gradient, and the like.

Figure 3:
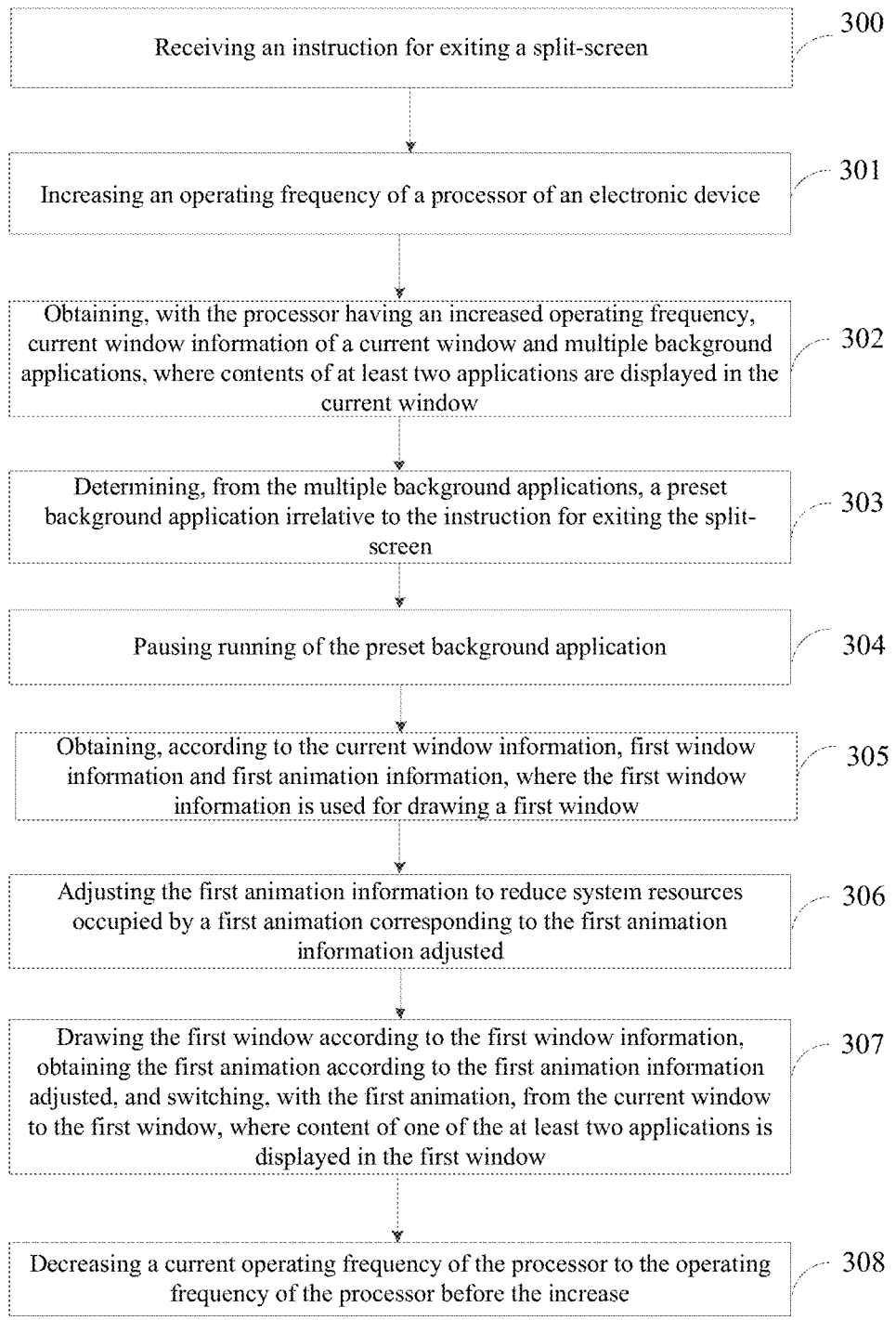
FIG. 3 is a schematic flow chart illustrating a method for exiting the split-screen according to other implementations.

FIG. 3 is a schematic flow chart illustrating a method for exiting a split-screen according to other implementations. As illustrated in FIG. 3, the method begins at block 301.

At block 300, an instruction for exiting a split-screen is received.

In one example, the instruction for exiting the split-screen may be input in response to a long-press operation on a certain function key, for example, the multi-task key, a menu key, or the like. Alternatively, the instruction for exiting the split-screen may be input in response to an operation of enabling that a ratio of an area of an interface of one of the at least two applications displayed in the current window to an area of the current window exceeds a predetermined ratio, such as 90%. Alternatively, the instruction for exiting the split-screen may be input in response to a gesture, for example, a gesture of sliding downwardly with three fingers.

At block 301, an operating frequency of a processor of an electronic device is increased from a first operating frequency to a second operating frequency.

In at least one implementation, after the instruction for exiting the split-screen is received, the operating frequency of the processor of the electronic device is increased, that is, an operation speed of the processor is improved. For example, the processor is a central processing unit (CPU) that can control the overall operation of the electronic device. For another example, the processor is a graphics processing unit (GPU), that is, a microprocessor for image operation. For yet another example, the processor includes both the CPU and the GPU.

When the operating frequency of the CPU is increased, the overall operation speed of the electronic device can be improved. When the operating frequency of the GPU is increased, the speed of window drawing can be improved. The first operating frequency (that is, an operating frequency of the processor before the increase) is a rated operating frequency of the processor, and the second operating frequency (that is, an operating frequency of the processor subjected to the increase) exceeds the rated operating frequency.

At block 302, current window information of a current window and multiple background applications are obtained with the processor having the second operating frequency, where contents of at least two applications are displayed in the current window.

The current window is a split-screen display window in which contents of two or more applications is simultaneously displayed. In the implementations, two applications are taken as an example for illustration. The current window is divided into two sub-windows, and in each sub-window, content of one of the two applications is displayed. The two applications run separately. Each application can receive a control instruction separately and corresponding content is accordingly displayed in response to the control instruction. For example, content of a video application may be displayed in one of the two sub-windows and content of a chat application may be displayed in the other of the two sub-windows. Since the two applications run separately, it is possible to allow the user to chat with others while watching videos.

The current window information contains information for drawing the current window, such as a size of the current window, a size of each of the two sub-windows, color of content displayed in each of the two sub-windows, and the content displayed in each of the two sub-windows. All the contents displayed in the current window can be drawn according to the current window information. The current window information can be quickly obtained with the processor having the increased operating frequency. In addition, the multiple background applications can be obtained with the processor having the increased operating frequency.

At block 303, at least one preset background application irrelative to the instruction for exiting the split-screen is determined from the multiple background applications.

The multiple background applications may include a system application, a window-drawing application, an installation application, and the like. Upon receipt of the instruction for exiting the split-screen, the electronic device currently needs to determine an application related to the instruction for exiting the split-screen, and determine, from the multiple background applications, at least one preset background application irrelative to the instruction for exiting the split-screen. When the instruction for exiting the split-screen is received, the electronic device needs to exit the current window, draw a new window, and switch from the current window to the new window. In this case, the window-drawing application is an application related to the instruction for exiting the split-screen. The window-drawing application is used for exiting the current window, drawing the new window, and switching from the current window to the new window.

For example, if a video application is downloading video data, the video application and a download application have no relation to the instruction for exiting the split-screen, and thus belong to preset background applications.

At block 304, running of the at least one preset background application is paused.

After the at least one preset background application irrelative to the instruction for exiting the split-screen is determined, the running of the at least one preset background application can be paused because the running of the at least one preset background application is not needed during switching from the current window to the first window, and thus system resources occupied by the at least one preset background application can be released. After the electronic device switches from the current window to the first window, continue the running of the at least one preset background application.

In at least one implementation, instead of performing the foregoing operations at block 303 and block 304, the following operations can be performed. A priority of each of the multiple background applications is obtained. A target background application having a priority lower than a predetermined priority threshold is determined from the multiple background applications. Running of the target background application is paused.

After the multiple background applications are obtained, the priority of each of the multiple background applications is obtained. In the implementations, an application related to the instruction for exiting the split-screen may generally have a higher priority. A lowest priority can be determined according to the priority of each of background applications related to the instruction for exiting the split-screen and may be set as the predetermined priority threshold. The priority of each of the multiple background applications other than the background applications related to the instruction for exiting the split-screen is compared with the predetermined priority threshold to determine one or more target background applications each having a priority lower than the predetermined priority threshold. Thereafter, pause running of the one or more target background applications. As such, there may have enough system resources for exiting the split-screen. After the electronic device switches from the current window to the first window, continue the running of the target background application.

In at least one implementation, the method further includes the following. After the instruction for exiting the split-screen is received, a priority of a first application related to the instruction for exiting the split-screen is obtained. Determine whether the priority of the first application is lower than a first level priority threshold. The priority of the first application is adjusted to be a first level priority in response to determining that the priority of the first application is lower than the first level priority threshold. Multiple applications currently running in the electronic device are obtained. The multiple applications are sorted in a first order of priorities of the multiple applications. The multiple applications sorted in the first order are controlled to work sequentially, where the first order is a descending order.

In one example, the first application is related to the instruction for exiting the split-screen. The first application is used for exiting the current window, drawing the first window, switching from the current window to the first window, and the like.

In one example, the first level priority threshold is a highest level priority or a higher level priority, such as a second level priority.

For example, if the first application has the highest priority, there is no need to adjust the priority of the first application. For another example, if the first application has a lower priority or does not have the highest priority (for example, the priority of the first application is lower than the first level priority threshold), the priority of the first application may be increased. When the instruction for exiting the split-screen is received, the multiple applications currently running in the electronic device are obtained, the multiple applications are sorted in the first order of the priorities of the multiple applications, and the multiple applications sorted in the first order are controlled to work sequentially, where the first order is a descending order. In one example, the multiple applications include a foreground application and a background application, or include a system application and an installation application. If the first application has the same priority level as an application among the multiple applications currently running in the electronic device other than the first application, the first application is arranged before the application among the multiple applications currently running in the electronic device other than the first application.

In one example, the multiple applications sorted in the first order are controlled to work sequentially as follows. An application with the highest priority among the multiple applications is first controlled to work. After running of the application with the highest priority among the multiple applications is completed, an application with the highest priority among the remaining applications can be controlled to work. Other applications can be controlled to work in a similar way described above. In addition, preset running duration can be set. An application with the highest priority among the multiple applications is first controlled to work. After the preset running duration has elapsed, the application with the second highest priority can be controlled to work. After the application with the second highest priority has worked for the preset running duration, the application with the third highest priority can be controlled to work. Other applications can be controlled to work in a similar way described above.

At block 305, first window information and first animation information are obtained according to the current window information, where the first window information is used for drawing a first window.

After the current window information is obtained, the first window information can be obtained according to the current window information. Thereafter, the first window can be drawn according to the first window information. The first window refers to a display window after the split-screen is exited, and content of one of the two applications is displayed in the first window. In addition, the first animation is obtained according to the first animation information. During switching from the current window to the first window, the first animation is used as a transition. For example, during switching from the current window to the first window, the current window disappears in gradient and the first window appears in gradient.

At block 306, the first animation information is adjusted to reduce system resources occupied by the first animation corresponding to the first animation information adjusted.

In at least one implementation, the first animation information is adjusted as follows. Duration of display of the first animation can be reduced. Alternatively, animation effects of the first animation can be simplified. Moreover, the first animation can be directly closed. Since the first animation information is adjusted, the system resources occupied by the first animation corresponding to the first animation information adjusted can be reduced.

In one example, the first animation can be closed as follows. The current window is overlaid with the first window. Alternatively, a black image is displayed in the whole current window before overlaying the current window with the first window. Alternatively, a screenshot of the content displayed in the current window can be taken and displayed in the current window, and the first window is drawn in the background. After drawing of the first window is completed, the current window is replaced with the first window.

At block 307, the first window is drawn according to the first window information, the first animation is obtained according to the first animation information adjusted, and switch, with the first animation, from the current window to the first window, where content of one of the at least two applications is displayed in the first window.

The first window is drawn according to the first window information. The first window refers to a display window after the split-screen is exited, and the content of one of the two applications is displayed in the first window. The first animation is obtained according to the first animation information adjusted. The first animation refers to an animation after adjustment. The system resources occupied by the first animation are less than that occupied by the first animation before adjustment. As such, during switching, with the first animation, from the current window to the first window, the system resources occupied by the first animation are reduced, thereby avoiding lag.

At block 308, the operating frequency of the processor is decreased from the second operating frequency to the first operating frequency.

After the split-screen is exited, the operating frequency of the processor is decreased from the second operating frequency to the first operating frequency. The first operating frequency (that is, the operating frequency of the processor before the increase) is a rated operating frequency of the processor. After the operating frequency of the processor has been increased, the processor has a high operation speed. However, such high operation speed brings problems such as more heat, difficult heat dissipation, and also that the processor is easily to be burn out. As such, it is necessary to decrease the operating frequency of the processor in time after exit of the split-screen is completed.

Figure 4:
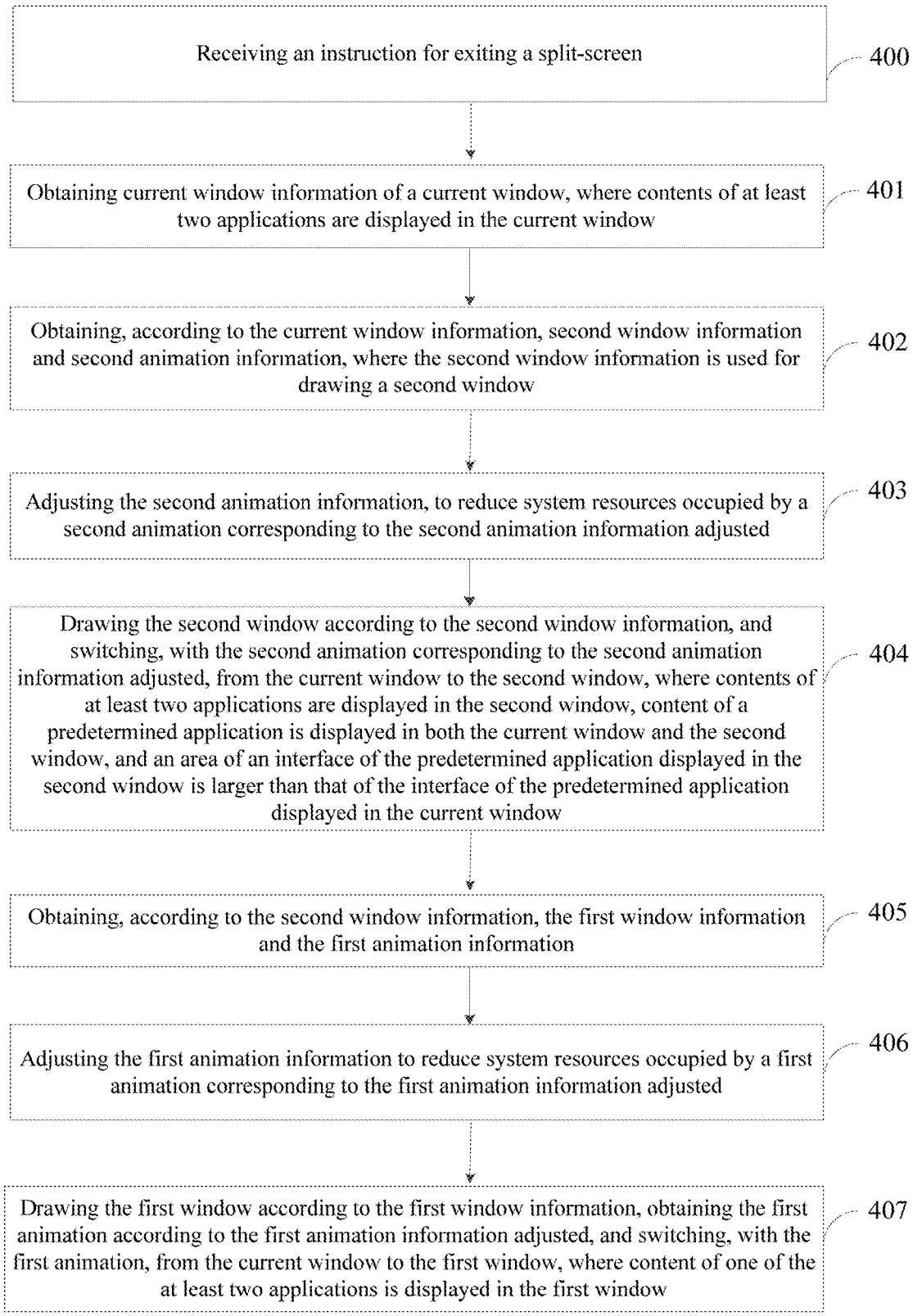
FIG. 4 is a schematic flow chart illustrating a method for exiting the split-screen according to yet other implementations.

FIG. 4 is a schematic flow chart illustrating a method for exiting a split-screen according to other implementations. As illustrated in FIG. 4, the method begins at block 401.

At block 400, an instruction for exiting a split-screen is received.

The instruction for exiting the split-screen may be input in response to a long-press operation on a certain function key, for example, the multi-task key, a menu key, or the like. Alternatively, the instruction for exiting the split-screen may be input in response to an operation of enabling that a ratio of an area of an interface of one of the at least two applications displayed in the current window to an area of the current window exceeds a predetermined ratio, such as 90%. Alternatively, the instruction for exiting the split-screen may be input in response to a gesture, for example, a gesture of sliding downwardly with three fingers.

At block 401, current window information of a current window is obtained, where contents of at least two applications are displayed in the current window.

The current window is a split-screen display window in which contents of two or more applications are simultaneously displayed. In the implementations, two applications are taken as an example for illustration. The current window is divided into two sub-windows, and in each sub-window, content of one of the two applications is displayed. The two applications run separately. Each application can receive a control instruction separately and corresponding content is accordingly displayed in response to the control instruction. For example, content of a video application may be displayed in one of the two sub-windows and content of a chat application may be displayed in the other of the two sub-windows. Since the two applications run separately, it is possible to allow the user to chat with others while watching videos.

The current window information contains information for drawing the current window, such as a size of the current window, a size of each of the two sub-windows, color of content displayed in each of the two sub-windows, and the content displayed in each of the two sub-windows. All the contents displayed in the current window can be drawn according to the current window information.

At block 402, second window information and second animation information are obtained according to the current window information, where the second window information is used for drawing a second window.

After the current window information is obtained, the second window information can be obtained according to the current window information. Thereafter, a second window can be drawn according to the second window information. In addition, a second animation can be obtained according to the second animation information. During switching from the current window to the second window, the second animation is used as a transition. For example, during switching from the current window to the second window, the current window disappears in rotation and the second window appears in rotation.

At block 403, the second animation information is adjusted to reduce system resources occupied by the second animation corresponding to the second animation information adjusted.

In one example, the second animation information is adjusted as follows. Duration of display of the second animation can be reduced. Alternatively, animation effects of the second animation can be simplified. Moreover, the second animation can be directly closed. Since the second animation information is adjusted, the system resources occupied by the second animation corresponding to the second animation information adjusted can be reduced.

At block 404, the second window is drawn according to the second window information, and switch, with the second animation corresponding to the second animation information adjusted, from the current window to the second window, where contents of at least two applications are displayed in the second window, content of a predetermined application is displayed in both the current window and the second window, and an area of an interface of the predetermined application displayed in the second window is larger than that of the interface of the predetermined application displayed in the current window.

The second window can be drawn according to the second window information. Similar to the current window, the contents of the at least two applications are displayed in the second window. The content of the same predetermined application is displayed in both the current window and the second window, and the area of the interface of the predetermined application displayed in the second window is larger than that of the interface of the predetermined application displayed in the current window. For example, an interface of a first predetermined application accounts for 50% of the current window, and the interface of the first predetermined application accounts for 70% of the second window. The second window can be regarded as a transition window between the current window and a window displayed after the split-screen is exited.

The second animation is obtained according to the second animation information adjusted, and the second animation refers to an animation after adjustment. The system resources occupied by the second animation are less than that occupied by the second animation before adjustment. As such, during switching, with the second animation, from the current window to the second window, the system resources occupied by the second animation are reduced, thereby avoiding lag.

At block 405, first window information and first animation information are obtained according to the second window information.

After the second window information is obtained, the first window information can be obtained according to the second window information. Thereafter, the first window can be drawn according to the first window information. The first window is a display window after the split-screen is exited, and content of one of the two applications is displayed in the first window. In addition, the first animation is obtained according to the first animation information. During switching from the current window to the first window, the first animation is used as a transition. For example, during switching from the current window to the first window, the current window disappears in gradient and the first window appears in gradient.

At block 406, the first animation information is adjusted to reduce system resources occupied by a first animation corresponding to the first animation information adjusted.

In at least one implementation, the first animation information is adjusted as follows. Duration of display of the first animation is reduced. Alternatively, animation effects of the first animation are simplified. Moreover, the first animation can be directly closed. Since the first animation information is adjusted, the system resources occupied by the first animation corresponding to the first animation information adjusted can be reduced.

At block 407, the first window is drawn according to the first window information, the first animation is obtained according to the first animation information adjusted, and switch, with the first animation, from the current window to the first window, where content of one of the at least two applications is displayed in the first window.

The first window can be drawn according to the first window information. The first window is a display window after the split-screen is exited, and the content of one of the two applications is displayed in the first window. The first animation is obtained according to the first animation information adjusted. The first animation refers to an animation after adjustment. The system resources occupied by the first animation are less than that occupied by the first animation before adjustment. As such, during switching, with the first animation, from the current window to the first window, the system resources occupied by the first animation are reduced, thereby avoiding lag.

Figure 5:
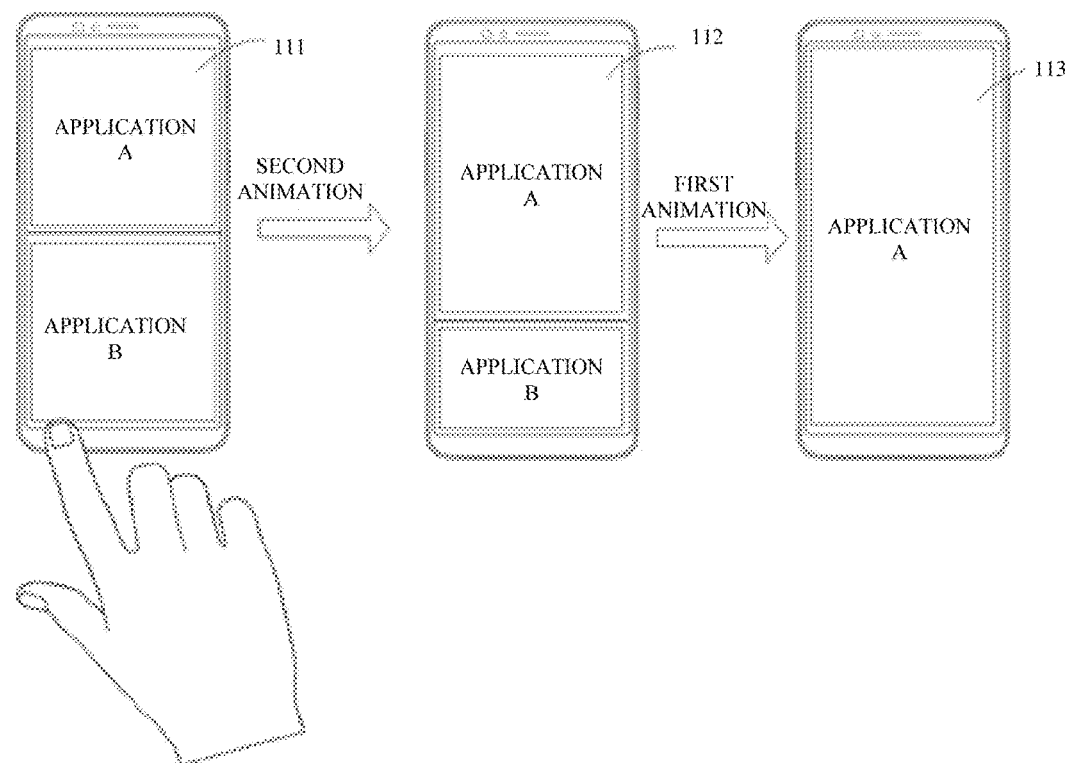
FIG. 5 is a schematic diagram illustrating a scenario to which a method for exiting the split-screen is applied according to other implementations.

It should be noted that, one or more transition windows similar to the second window can be provided during switching from the current window to the first window. During exit of split-screen, since a number of transition windows similar to the second window are provided during switching from the current window to the first window, the animation effects of the animation between the current window and the first window, and drawing of the number of transition windows and the first window need to occupy a lot of resources, which may cause a lag. By adjusting the animation information of the animation between the current window and the first window, the lag may be avoided. As illustrated in FIG. 5, interfaces of application A and application B displayed in the current window 111 each account for 50% of the current window. When the instruction for exiting the split-screen is received, the electronic device first switches, with second animation, from the current window 111 to the second window 112, and the interface of application A displayed in the second window 112 accounts for 75% of the second window 112 and the interface of application B displayed in the second window 112 accounts for 25% of the second window 112. Thereafter, the electronic device switches, with the first animation, from the second window 112 to the first window 113. The interface of application A displayed in the first window 113 accounts for 100% of the first window 113, and application B is switched to the background. FIG. 5 is merely illustrative, and an additional transition window such as a third window or a fourth window can be provided during switching from the second window to the first window.

According to the method for exiting the split-screen, when the instruction for exiting the split-screen is received, the current window information of the current window is obtained, where the contents of the at least two applications are displayed in the current window. The first window information and the first animation information are obtained according to the current window information, where the first window information is used for drawing the first window. The first animation information is adjusted to reduce system resources occupied by the first animation corresponding to the first animation information adjusted. The first window is drawn according to the first window information, the first animation is obtained according to the first animation information adjusted, and switch, with the first animation, from the current window to the first window, where the content of one of the at least two applications is displayed in the first window. When the instruction for exiting the split-screen is received, the first animation information is adjusted to reduce the system resources occupied by the first animation corresponding to the first animation information adjusted. During exit of split-screen, since the system resources occupied by the first animation is reduced, lag may be avoided during switching, with the first animation corresponding to the first animation information adjusted, from the current window to the first window.

Figure 6:
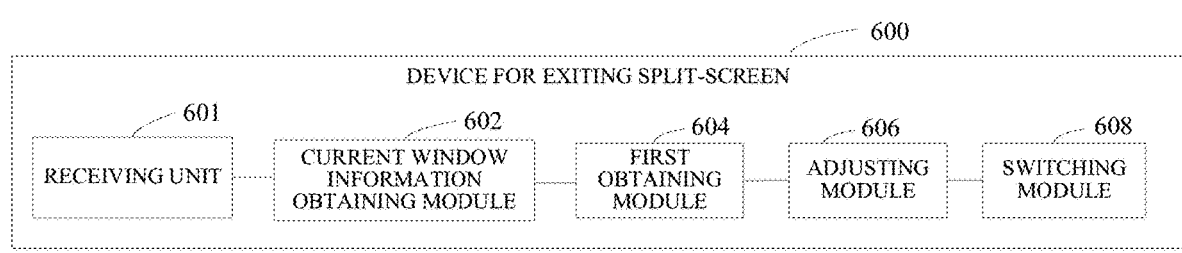
FIG. 6 is a schematic structural diagram illustrating a device for exiting the split-screen according to implementations.

FIG. 6 is a schematic structural diagram illustrating a device for exiting a split-screen according to implementations. As illustrated in FIG. 6, the device 600 for exiting the split-screen is applicable to an electronic device and includes a receiving unit 601, a current window information obtaining module 602, a first obtaining module 604, an adjusting module 606, and a switching module 608. The receiving unit 601 is configured to receive an instruction for exiting a split-screen. The current window information obtaining module 602 is configured to obtain current window information of a current window, where contents of at least two applications are displayed in the current window. The first obtaining module 604 is configured to obtain, according to the current window information, first window information and first animation information, where the first window information is used for drawing a first window. The adjusting module 606 is configured to adjust the first animation information to reduce system resources occupied by a first animation corresponding to the first animation information adjusted. The switching module 608 is configured to draw the first window according to the first window information, obtain the first animation according to the first animation information adjusted, and switch, with the first animation, from the current window to the first window, where content of one of the at least two applications is displayed in the first window.

Figure 7:
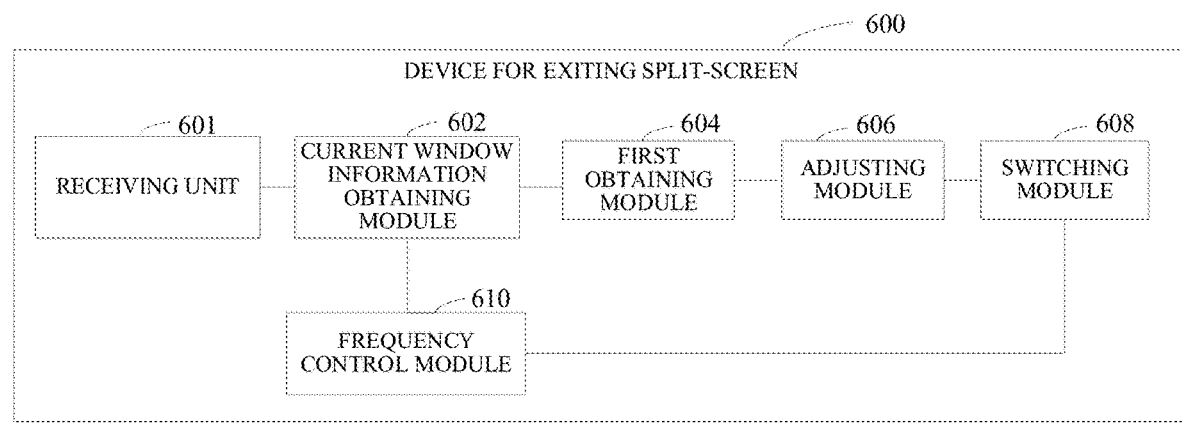
FIG. 7 is a schematic structural diagram illustrating a device for exiting the split-screen according to other implementations.

FIG. 7 is a schematic structural diagram illustrating a device for exiting the split-screen according to other implementations. As illustrated in FIG. 7, the device 600 for exiting the split-screen further includes a frequency control module 405. The frequency control module 405 is configured to increase an operating frequency of a processor of the electronic device from a first operating frequency to a second operating frequency. The current window information obtaining module 602 is configured to obtain, with the processor having the second operating frequency, the current window information of the current window. The frequency control module 405 is configured to decrease the operating frequency of the processor from the second operating frequency to the first operating frequency after switching from the current window to the first window.

In one example, the device 600 further includes a background application obtaining module, a preset background application determining module, and a pausing module. The background application obtaining module is configured to obtain multiple background applications. The preset background application determining module is configured to determine, from the multiple background applications, at least one preset background application irrelative to the instruction for exiting the split-screen. The pausing module is configured to pause running of the at least one preset background application.

In one example, the device 600 further includes a background application obtaining module, a priority obtaining module, a target background application determining module, and a pausing module. The background application obtaining module is configured to obtain the multiple background applications. The priority obtaining module is configured to obtain a priority of each of the multiple background applications. The target background application determining module is configured to determine, from the multiple background applications, a target background application having a priority lower than a predetermined priority threshold. The pausing module is configured to pause running of the target background application.

In one example, the device 600 further includes a first application priority obtaining module, a determining module, a priority adjusting module, and a control module. The first application priority obtaining module is configured to obtain a priority of a first application related to the instruction for exiting the split-screen. The determining module is configured to determine whether the priority of the first application is lower than a first level priority threshold. The priority adjusting module is configured to adjust the priority of the first application to be a first level priority in response to determining that the priority of the first application is lower than the first level priority threshold. The control module is configured to obtain multiple applications currently running in the electronic device, sort the multiple applications in a first order of priorities of the multiple applications, and control the multiple applications sorted in the first order to work sequentially, where the first order is a descending order.

In one example, the device 600 further includes a second obtaining module and a second adjusting module. The second obtaining module is configured to obtain, according to the current window information, second window information and second animation information, where the second window information is used for drawing a second window. The second adjusting module is configured to adjust the second animation information to reduce system resources occupied by a second animation corresponding to the second animation information adjusted. The switching module 608 is further configured to draw the second window according to the second window information, and switch, with the second animation corresponding to the second animation information adjusted, from the current window to the second window, where contents of at least two applications are displayed in the second window, content of a predetermined application is displayed in both the current window and the second window, and an area of an interface of the predetermined application displayed in the second window is larger than that of the interface of the predetermined application displayed in the current window. The first obtaining module is further configured to obtain, according to the second window information, the first window information and the first animation information.

According to the device for exiting the split-screen, the receiving unit 601 receives the instruction for exiting the split-screen, the current window information obtaining module 602 obtains the current window information of the current window, where the content of the at least two applications is displayed in the current window. The first obtaining module 604 obtains, according to the current window information, the first window information and the first animation information, where the first window information is used for drawing the first window. The adjusting module 606 adjusts the first animation information to reduce the system resources occupied by the first animation corresponding to the first animation information adjusted. Thereafter, the switching module 608 draws the first window according to the first window information, obtains the first animation according to the first animation information adjusted, and switches, with the first animation, from the current window to the first window, where the content of one of the at least two applications is displayed in the first window. When the instruction for exiting the split-screen is received, the first animation information is adjusted to reduce the system resources occupied by the first animation corresponding to the first animation information adjusted. During exit of split-screen, since the system resources occupied by the first animation are reduced, lag may be avoided during switching, with the first animation, from the current window to the first window.

Figure 8:
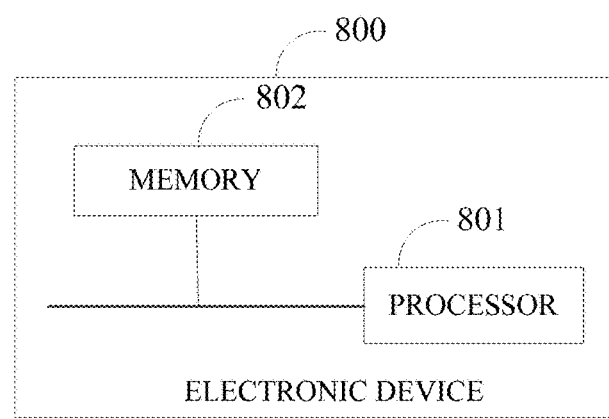
FIG. 8 is a schematic structural diagram illustrating an electronic device according to implementations.

Implementations further include an electronic device. As illustrated in FIG. 8, the electronic device 800 includes a processor 801 and a memory 802 electrically coupled with the processor 801.

The processor 801 is a control center of the electronic device 800. The processor 801 is configured to connect various parts of the entire electronic device 800 through various interfaces and lines, and to execute various functions of the electronic device 800 and process data by running or executing software programs stored in the memory 802 and invoking data stored in the memory 802, thereby realizing automatic change of material information of the electronic device.

The memory 802 is configured to store software programs and modules. The processor 801 is configured to execute various function applications and data processing by running the software programs and the modules stored in the memory 802. The memory 802 may mainly include a program storage region and a data storage region. The program storage region may store an operating system, applications required for at least one function (such as a sound playing function, an image playing function, and so on), and the like. The data storage region may store data created according to the use of the electronic device, and the like. In addition, the memory 802 may include a high-speed random-access memory (RAM), and may further include a non-transitory memory, such as at least one disk storage device, a flash device, or other non-transitory solid-state storage devices. In addition, the memory 802 further includes a memory controller for facilitating access to the memory 802 by the processor 801.

According to implementations, the processor 801 in the electronic device 800 loads the processes or instructions corresponding to one or more computer programs into the memory 802 according to the following operations, and the processor 801 runs the computer programs stored in the memory 802, thereby realizing various functions. An instruction for exiting a split-screen is received, and current window information of a current window is obtained, where contents of at least two applications are displayed in the current window. First window information and first animation information are obtained according to the current window information, where the first window information is used for drawing a first window. The first animation information is adjusted to reduce system resources occupied by a first animation corresponding to the first animation information adjusted. The first window is drawn according to the first window information, the first animation is obtained according to the first animation information adjusted, and switch, with the first animation, from the current window to the first window, where content of one of the at least two applications is displayed in the first window.

In one example, the processor 801 configured to obtain the current window information of the current window is configured to: increase an operating frequency of a processor of the electronic device from a first operating frequency to a second operating frequency; obtain, with the processor having an second operating frequency, the current window information of the current window. The processor is further configured to decrease the operating frequency of the processor from the second operating frequency to the first operating frequency, after drawing the first window according to the first window information, obtaining the first animation according to the first animation information adjusted, and switching, with the first animation, from the current window to the first window.

In one example, the processor 801 is further configured to: obtain multiple background applications; determine, from the multiple background applications, at least one preset background application irrelative to the instruction for exiting the split-screen; pause running of the at least one preset background application.

In one example, the processor 801 is configured to: obtain multiple background applications; obtain a priority of each of the multiple background applications; determine, from the multiple background applications, a target background application having a priority lower than a predetermined priority threshold; pause running of the target background application.

In one example, the processor 801 is further configured to: obtain a priority of a first application related to the instruction for exiting the split-screen; determine whether the priority of the first application is lower than a first level priority threshold; adjust the priority of the first application to be a first level priority in response to determining that the priority of the first application is lower than the first level priority threshold; obtain multiple applications currently running in the electronic device, sort the multiple applications in a first order of priorities of the multiple applications, and control the multiple applications sorted in the first order to work sequentially, where the first order is a descending order.

In one example, the processor 801 configured to obtain, according to the current window information, the first window information and the first animation information is configured to: obtain, according to the current window information, second window information and second animation information, where the second window information is used for drawing a second window; adjust the second animation information to reduce system resources occupied by a second animation corresponding to the second animation information adjusted; draw the second window according to the second window information, and switch, with the second animation corresponding to the second animation information adjusted, from the current window to the second window, where the content of the at least two applications is displayed in the second window, content of a predetermined application is displayed in both the current window and the second window, and an area of an interface of the predetermined application displayed in the second window is larger than that of the interface of the predetermined application displayed in the current window; obtain, according to the second window information, the first window information and the first animation information.

According to the electronic device, the instruction for exiting the split-screen is received, and the current window information of the current window is obtained, where the content of the at least two applications is displayed in the current window. The first window information and the first animation information are obtained according to the current window information, where the first window information is used for drawing the first window. The first animation information is adjusted to reduce system resources occupied by the first animation corresponding to the first animation information adjusted. The first window is drawn according to the first window information, the first animation is obtained according to the first animation information adjusted, and switch, with the first animation, from the current window to the first window, where the content of one of the at least two applications is displayed in the first window. When the instruction for exiting the split-screen is received, the first animation information is adjusted to reduce the system resources occupied by the first animation corresponding to the first animation information adjusted. During exit of split-screen, since the system resources occupied by the first animation are reduced, lag may be avoided during switching, with the first animation, from the current window to the first window.

Figure 9:
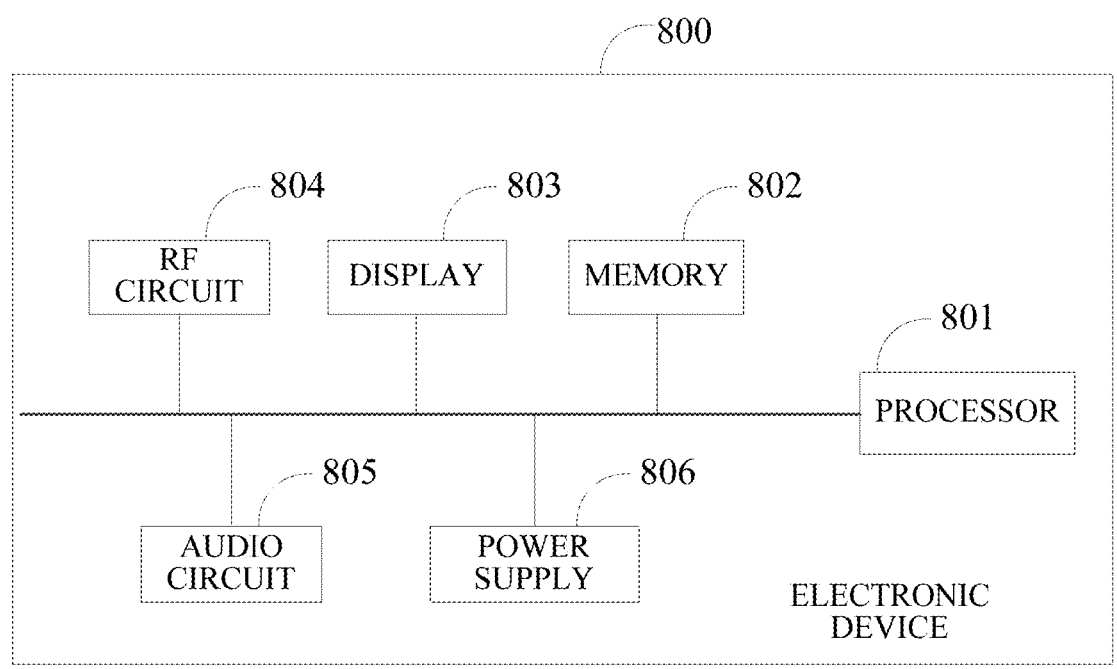
FIG. 9 is a schematic structural diagram illustrating an electronic device according to other implementations.

As illustrated in FIG. 9, the electronic device 800 further includes a display 803, a radio frequency (RF) circuit 804, an audio circuit 805, and a power supply 806. The display 803, the RF circuit 804, the audio circuit 805, and the power supply 806 are respectively electrically coupled with the processor 801.

The display 803 is configured to display information input by a user or information provided for the user or various graphical user interfaces (GUI). The GUI can be composed of graphics, a text, an icon, a video, and any combination thereof. The display 803 may include a display panel. In an example, the display panel may be in the form of a liquid crystal display (LCD), an organic light-emitting diode (OLED), and so on.

The RF circuit 804 is configured to receive and transmit radio frequency signals. The RF circuit 804 may communicate with a network device or other electronic devices via wireless communication, to receive and transmit signals with the network device or other electronic devices.

The audio circuit 805 includes a speaker and a microphone to provide an audio interface between the user and the electronic device.

The power supply 806 is configured to supply supplies power to various components of the electronic device 800. In one example, the power supply 806 may be logically coupled to the processor 801 via a power management system to achieve management of charging, discharging, and power consumption through the power management system.

Although not illustrated, a camera, a Bluetooth module, etc. may further be included in the electronic device 800, which will not be elaborated herein.

Implementations further include a non-transitory computer readable storage medium storing computer programs. The computer programs, when executed by a processor, are operable with the processor to perform the following. An instruction for exiting a split-screen is received, and current window information of a current window is obtained, where contents of at least two applications are displayed in the current window. First window information and first animation information are obtained according to the current window information, where the first window information is used for drawing a first window. The first animation information is adjusted to reduce system resources occupied by a first animation corresponding to the first animation information adjusted. The first window is drawn according to the first window information, the first animation is obtained according to the first animation information adjusted, and switch, with the first animation, from the current window to the first window, where content of one of the at least two applications is displayed in the first window.

According to implementations, the storage medium may be a magnetic disk, an optical disk, a read-only memory (ROM), or a RAM.

In the foregoing implementations, the description of each implementation has its own emphasis. For the parts not described in detail in one implementation, reference may be made to related descriptions in other implementations.

It will be understood by those of ordinary skill in the art that all or a part of the various methods of the implementations described above may be accomplished by means of a computer program to instruct associated hardware, the computer program may be stored in a computer-readable storage medium. For example, the computer program may be stored in a memory of the electronic device, and executed by at least one processor in the electronic device to perform the operations of the method described above. The computer-readable storage medium may include a disk, an optical disk, a ROM, a RAM, and so on.

For the device for exiting the split-screen, functional units in various implementations may be integrated into one processing unit, or each unit may be physically present, or two or more units may be integrated into one unit. The above-mentioned integrated unit can be implemented in the form of hardware or a software function unit. The integrated unit may be stored in a computer-readable storage medium when it is implemented in the form of a software functional unit and is sold or used as a separate product. The storage medium may be a ROM, a disk, or an optical disk.

The foregoing illustrates the method and the device for exiting the split-screen, the storage medium, and the electronic device of the implementations of the disclosure in detail. The principle and implementations of the disclosure are illustrated by specific examples. The illustration of the above implementations is merely used to facilitate understanding of the methods and core concept. For a person skilled in the art, according to the concept of the disclosure, specific implementations and application ranges may be both changed. Based on the above, the disclosure shall not be understood to be limited to the specification.

What is claimed is:

1. A method for exiting a split-screen of an electronic device, comprising:
    receiving an instruction for exiting a split-screen;
    obtaining current window information of a current window, wherein contents of at least two applications are displayed in the current window;
    obtaining, according to the current window information, first window information and first animation information, wherein the first window information is used for drawing a first window;
    adjusting the first animation information to reduce system resources occupied by a first animation corresponding to the first animation information adjusted; and
    drawing the first window according to the first window information, obtaining the first animation according to the first animation information adjusted, and switching, with the first animation, from the current window to the first window, wherein content of one of the at least two applications is displayed in the first window, wherein during switching, with the first animation, from the current window to the first window, a manner in which the current window disappears is the same as that in which the first window appears;
    wherein after receiving the instruction for exiting the split-screen, the method further comprises obtaining a plurality of background applications, and one of the following:
        determining, from the plurality of background applications, a preset background application irrelative to the instruction for exiting the split-screen; and pausing running of the preset background application; and obtaining a priority of each of the plurality of background applications; determining, from the plurality of background applications, a target background application having a priority lower than a predetermined priority threshold; and pausing running of the target background application.

2. The method of claim 1, wherein obtaining the current window information of the current window comprises:

increasing an operating frequency of a processor of the electronic device from a first operating frequency to a second operating frequency; and obtaining, with the processor having the second operating frequency, the current window information of the current window.

3. The method of claim 2, further comprising:

after drawing the first window according to the first window information, obtaining the first animation according to the first animation information adjusted, and switching, with the first animation, from the current window to the first window, decreasing the operating frequency of the processor from the second operating frequency to the first operating frequency.

4. The method of claim 1, further comprising:

after switching, with the first animation, from the current window to the first window:

continuing the running of the preset background application.

5. The method of claim 1, further comprising:

after switching, with the first animation, from the current window to the first window:

continuing the running of the target background application.

6. The method of claim 1, further comprising:

after receiving the instruction for exiting the split-screen:

obtaining a priority of a first application related to the instruction for exiting the split-screen;

determining whether the priority of the first application is lower than a first level priority threshold;

adjusting the priority of the first application to be a first level priority in response to determining that the priority of the first application is lower than the first level priority threshold; and obtaining a plurality of applications currently running in the electronic device, sorting the plurality of applications in a descending order of priorities of the plurality of applications, and controlling the plurality of applications sorted to work sequentially.

7. The method of claim 1, wherein obtaining, according to the current window information, the first window information and the first animation information comprises:

obtaining, according to the current window information, second window information and second animation information, wherein the second window information is used for drawing a second window;

adjusting the second animation information to reduce system resources occupied by a second animation corresponding to the second animation information adjusted;

drawing the second window according to the second window information, and switching, with the second animation corresponding to the second animation information adjusted, from the current window to the second window, wherein contents of at least two applications are displayed in the second window, in both the current window and the second window content of a predetermined application is displayed, and an area of an interface of the predetermined application displayed in the second window is larger than that of the interface of the predetermined application displayed in the current window; and obtaining, according to the second window information, the first window information and the first animation information.

8. The method of claim 1, wherein adjusting the first animation information to reduce the system resources occupied by the first animation corresponding to the first animation information adjusted comprises:

reducing duration of display of the first animation or simplifying animation effects of the first animation, to reduce the system resources occupied by the first animation corresponding to the first animation information adjusted.

9. The method of claim 1, wherein switching, with the first animation, from the current window to the first window comprises:

overlaying the current window with a black image; and overlaying the black image with the first animation to switch to the first window.

10. An electronic device, comprising:

a memory storing computer programs; and a processor coupled with the memory;

wherein the computer programs are executable on the processor and the processor is configured to:

receive an instruction for exiting a split-screen;

obtain current window information of a current window, wherein contents of at least two applications are displayed in the current window;

obtain, according to the current window information, first window information and first animation information, wherein the first window information is used for drawing a first window;

adjust the first animation information to reduce system resources occupied by a first animation corresponding to the first animation information adjusted; and draw the first window according to the first window information, obtain the first animation according to the first animation information adjusted, and switch, with the first animation, from the current window to the first window, wherein content of one of the at least two applications is displayed in the first window, wherein during switching, with the first animation, from the current window to the first window, a manner in which the current window disappears is the same as that in which the first window appears;

obtain a plurality of background applications and one of the following:

determine, from the plurality of background applications, a preset background application irrelative to the instruction for exiting the split-screen; and pause running of the preset background application; and obtain a priority of each of the plurality of background applications; determine, from the plurality of background applications, a target background application having a priority lower than a predetermined priority threshold; and pause running of the target background application.

11. The electronic device of claim 10, wherein the processor configured to obtain the current window information of the current window is configured to:

increase an operating frequency of a processor of the electronic device from a first operating frequency to a second operating frequency; and obtain, with the processor having the second operating frequency, the current window information of the current window;

wherein the processor is further configured to:
after drawing the first window according to the first window information, obtaining the first animation according to the first animation information adjusted, and switching, with the first animation, from the current window to the first window:
decrease the operating frequency of the processor from the second operating frequency to the first operating frequency.

12. The electronic device of claim 10, wherein the processor is further configured to:
obtain a priority of a first application related to the instruction for exiting the split-screen;
determine whether the priority of the first application is lower than a first level priority threshold;
adjust the priority of the first application to be a first level priority in response to determining that the priority of the first application is lower than the first level priority threshold; and
obtain a plurality of applications currently running in the electronic device, sort the plurality of applications in a descending order of priorities of the plurality of applications, and control the plurality of applications sorted to work sequentially.

13. The electronic device of claim 10, wherein the processor configured to obtain, according to the current window information, the first window information and the first animation information is configured to:
obtain, according to the current window information, second window information and second animation information, wherein the second window information is used for drawing a second window;
adjust the second animation information to reduce system resources occupied by a second animation corresponding to the second animation information adjusted;
draw the second window according to the second window information, and switch, with the second animation corresponding to the second animation information adjusted, from the current window to the second window, wherein contents of at least two applications are displayed in the second window, in both the current window and the second window content of a predetermined application is displayed, and an area of an interface of the predetermined application displayed in the second window is larger than that of the interface of the predetermined application displayed in the current window; and
obtain, according to the second window information, the first window information and the first animation information.

14. The electronic device of claim 10, wherein the processor configured to adjust the first animation information to reduce the system resources occupied by the first animation corresponding to the first animation information adjusted is configured to:
reduce duration of display of the first animation or simplify animation effects of the first animation, to reduce the system resources occupied by the first animation corresponding to the first animation information adjusted.

15. The electronic device of claim 10, wherein the processor configured to switch, with the first animation, from the current window to the first window is configured to:
overlay the current window with a black image; and
overlay the black image with the first animation to switch to the first window.

16. A non-transitory computer readable storage medium configured to store computer programs which, when executed by a processor, are operable with the processor to:
receive an instruction for exiting a split-screen;
obtain current window information of a current window, wherein contents of at least two applications are displayed in the current window;
obtain, according to the current window information, first window information and first animation information, wherein the first window information is used for drawing a first window;
adjust the first animation information to reduce system resources occupied by a first animation corresponding to the first animation information adjusted; and
draw the first window according to the first window information, obtain the first animation according to the first animation information adjusted, and switch, with the first animation, from the current window to the first window, wherein content of one of the at least two applications is displayed in the first window, wherein during switching, with the first animation, from the current window to the first window, a manner in which the current window disappears is the same as that in which the first window appears;
obtain a plurality of background applications and one of the following:
determine, from the plurality of background applications, a preset background application irrelative to the instruction for exiting the split-screen; and pause running of the preset background application; and
obtain a priority of each of the plurality of background applications; determine, from the plurality of background applications, a target background application having a priority lower than a predetermined priority threshold; and pause running of the target background application.

* * * * *